UNITED STATES PATENT OFFICE.

H. McKENZIE, OF TALLADEGA, ALABAMA.

IMPROVEMENT IN TANNING LEATHER.

Specification forming part of Letters Patent No. 32,526, dated June 11, 1861.

*To all whom it may concern:*

Be it known that I, HENRY MCKENZIE, of Talladega, in the county of Talladega and State of Alabama, have invented a new and useful Improvement in Tanning; and I do hereby declare that the following is a full, clear, and exact description of the same.

This invention consists in the employment or use of the root and other parts of the plant known by the name of "Red-Root," (*Ceanothus Americanus,*) as a substitute for tanning-bark for the purpose of tanning skins or hides.

To enable those skilled in the art to use my invention, I will proceed to describe the manner in which I apply the above-named plant or its parts.

The hides or skins after, having been prepared in the ordinary manner, are put into a weak ooze of the root or other parts of the red-root plant and handled the same as in ordinary tanning with oak or other bark for the space of one month, (more or less, according to the nature of the hides or skins,) during which time new material is added from time to time to strengthen the ooze. After this the hides or skins are removed from the ooze and laid away in vats with the red-root plant ground into a coarse powder, and they are turned with fresh material three times at proper intervals during the next four months, (more or less, according to the nature of the hides or skins,) and at the expiration of this time they are taken out and finished in the ordinary manner.

The leather thus produced is equal in every respect to the leather tanned with the best quality of tan-bark, and, from the above description, it will be seen that the treatment or the process is identically the same, the only difference being that I have substituted portions of the red-root plant for the ordinary tanning-bark. The infusion or ooze of the root of said plant, when taken alone, gives to the leather a beautiful color, and it prepares the hides or skins better than any other material heretofore used for tanning; but in the subsequent part of the tanning process the leaves, and, in fact, the entire plant, may be used to advantage. Even where tan-bark is cheap the red-root is preferable, first, because it gives to the leather a beautiful color; and, second, because it does not contract the surface of the hide or skin like the tan-bark, and it prepares the same much better for tanning than the common method. The red-root may also be used in combination with oak-bark or other substances containing tannin, and when thus applied for tanning heavy sole-leather it produces a heavier and more durable leather than the tan-bark alone.

The principal advantage of my invention, however, arises from the fact that red-root or *Ceanothus Americanus* grows in the greatest profusion throughout the United States, and it is one of the most hardy and most common plants, which can be cultivated with little or no expense in any desired quantity.

Having thus fully described my invention, what I claim as new, and desire to secure by Letters Patent, is—

The employment or use of the root and other parts of the plant known by the name of "*Ceanothus Americanus*," either alone or mixed with oak-bark or other tanning materials, as described, for the purpose of tanning hides or skins.

H. McKENZIE.

Witnesses:
  G. MILLER,
  WM. H. COKER.